United States Patent
Prosser et al.

(10) Patent No.: US 11,592,839 B2
(45) Date of Patent: Feb. 28, 2023

(54) NON-BINARY COLLABORATIVE RECOVERY SYSTEM

(71) Applicant: Gulfstream Aerospace Corporation, Savannah, GA (US)

(72) Inventors: Kevin Prosser, Savannah, GA (US); Thomas Landers, Savannah, GA (US); Alborz Sakhaei, Savannah, GA (US); Abhishek Vaidya, Savannah, GA (US); Blake Finlayson, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 334 days.

(21) Appl. No.: 16/552,634

(22) Filed: Aug. 27, 2019

(65) Prior Publication Data

US 2020/0064835 A1 Feb. 27, 2020
US 2021/0397183 A9 Dec. 23, 2021

Related U.S. Application Data

(60) Provisional application No. 62/723,187, filed on Aug. 27, 2018.

(51) Int. Cl.
*G05D 1/08* (2006.01)
*G05D 1/00* (2006.01)
(Continued)

(52) U.S. Cl.
CPC ......... *G05D 1/0816* (2013.01); *G05D 1/0061* (2013.01); *G05D 1/0088* (2013.01);
(Continued)

(58) Field of Classification Search
CPC .. G05D 1/0816; G05D 1/0106; G05D 1/0061; G05D 1/0088; G05D 1/106;
(Continued)

(56) References Cited

U.S. PATENT DOCUMENTS

| 9,938,018 | B2 * | 4/2018 | Welsh | G05D 1/0061 |
| 2004/0215372 | A1 * | 10/2004 | Bateman | G05D 1/0061 |
| | | | | 701/1 |

(Continued)

FOREIGN PATENT DOCUMENTS

EP 2187371 A1 5/2010

OTHER PUBLICATIONS

Itoh Eri et al, Evaluation on Novel Architecture for Harmonizing manual and Automatic Flight Controls under Atmospheric Turbulence, Aerospace Science and Technology, Elsevier Masson, FR, vol. 24, No. 1, Nov. 25, 2011, pp. 241-254.

*Primary Examiner* — Isaac G Smith
*Assistant Examiner* — Christopher George Fees
(74) *Attorney, Agent, or Firm* — LKGlobal | Lorenz & Kopf, LLP (57) ABSTRACT

The processor supplies flight commands to the flight control system by selectively blending pilot input with control signals from the autopilot. The processor generates a projected recovery trajectory through successive iterations, each beginning at the current aircraft location and using a recovery constraint selectable by the processor to influences a degree of flight aggressiveness. A detection system that identifies and invokes a state of threat existence if a threat exists along the projected recovery trajectory. The processor during threat existence in a first iteration commands an initial soft recovery, with permitted blended pilot input. If the threat exists on subsequent iteration, the processor commands a more aggressive recovery while attenuating blended pilot input.

16 Claims, 5 Drawing Sheets

(51) Int. Cl.
*G05D 1/10* (2006.01)
*G06K 9/62* (2022.01)
*G08G 5/00* (2006.01)
*G08G 5/04* (2006.01)

(52) U.S. Cl.
CPC ........... G05D 1/106 (2019.05); G06K 9/6289 (2013.01); G08G 5/006 (2013.01); G08G 5/0039 (2013.01); G08G 5/04 (2013.01)

(58) Field of Classification Search
CPC .. G05D 1/1064; G06K 9/6289; G08G 5/0039; G08G 5/006; G08G 5/04; G08G 5/0021; G08G 5/0078; G08G 5/0091; G08G 5/045

See application file for complete search history.

(56) References Cited

U.S. PATENT DOCUMENTS

| | | | | |
|---|---|---|---|---|
| 2005/0073440 | A1* | 4/2005 | Jourdan | G08G 5/0086 340/961 |
| 2009/0082954 | A1* | 3/2009 | Ridenour, II | G01C 23/005 701/467 |
| 2010/0121503 | A1* | 5/2010 | Sundqvist | G08G 5/045 701/532 |
| 2010/0292871 | A1* | 11/2010 | Schultz | G01C 21/3852 342/29 |
| 2018/0101180 | A1* | 4/2018 | Greenfield | B64C 27/56 |

\* cited by examiner

NON-BINARY COLLABORATIVE RECOVERY SYSTEM

CROSS-REFERENCE TO RELATED APPLICATION

This application takes priority under 35 U.S.C. § 229 (e) to U.S. provisional application Ser. No. 62/723,187, filed Aug. 27, 2018, entitled Aircraft Flight Envelope Protection Framework; the entire disclosure, drawings and appendices of which are incorporated herein by reference.

TECHNICAL FIELD

The present disclosure generally relates to aircraft flight envelope protection systems, and more particularly to aircraft flight envelope protection systems that model potential aircraft trajectories and test those trajectories for aircraft limit violations and terrain avoidance hazards.

BACKGROUND

This section provides background information related to the present disclosure which is not necessarily prior art.

Aircraft are designed to operate within certain operating speeds and loads on control surfaces of the aircraft. These operating limits are known as the flight envelope, outside of which there may be damage or loss of control of the aircraft. Additionally, aircraft must operate over flight trajectories that avoid collision with material objects such as ground terrain and other aircraft. In order to protect against operating outside of the flight envelope or colliding with other objects, conventional aircraft utilize many disparate protection or safety systems that each evaluate individual aspects of the aircraft to determine whether the aircraft is operating outside of the flight envelope or is likely to collide with the ground or other objects on the present flight path.

Automated systems can be used to recover from a threat such as an envelope violation or collision with another object. Typically such recovery systems are designed with one thing in mind, namely recovery from the threat when it is detected, either by issuing a warning to the pilot or by operating in auto-recovery mode in which the autopilot system takes over for the pilot. Conventional recovery systems are binary in nature—they are either on or off; there are no middle states. While a conventional binary recovery system gets the basic job done, little attention is given to passenger comfort. This may be appropriate for a military jet, where the pilot is helmeted, strapped into an ejection seat system and prepared to absorb hard recovery g-forces, it is not appropriate for a commercial or business jet.

SUMMARY

The solution is a non-binary system. In the disclosed system, the smooth, passenger safe soft ride is used but pilot blending is allowed and the soft ride will automatically blend into a harder and harder recovery if the margins degrade or fail to improve.

To achieve this, the processor supplies flight commands to the flight control system by selectively blending pilot input with control signals from the autopilot. The processor generates a projected recovery trajectory through successive iterations, each beginning at the current aircraft location and using a recovery constraint selectable by the processor to influences a degree of flight aggressiveness. A detection system that identifies and invokes a state of threat existence if a threat exists along the projected recovery trajectory. The processor during threat existence in a first iteration commands an initial soft recovery, with permitted blended pilot input. If the threat exists on subsequent iteration, the processor commands a more aggressive recovery while attenuating blended pilot input.

In one aspect the disclosed concept provides a hazard recovery system for an aircraft having a flight control system capable of receiving flight commands from a pilot input and from an autopilot system. A processor is programmed to supply flight commands to the flight control system by selectively blending pilot input with control signals from the autopilot. The processor is programmed to generate a projected recovery trajectory through successive iterations that each begin at the current aircraft location and utilize a recovery constraint selectable by the processor that influences a degree of flight aggressiveness.

A detection system identifies and invokes a state of threat existence if a threat exists along the projected recovery trajectory. During this state of threat existence, the processor is programmed to execute in a first iteration: (a) command the autopilot system to fly a first instantiation of the projected recovery trajectory using a first recovery constraint selected to allow the aircraft to avoid the threat with first degree of flight aggressiveness and (b) apply a first weighting factor to the pilot input to produce a first degree of blending between pilot input and autopilot control.

If the state of threat existence continues during a subsequent iteration (e.g., the next iteration) the processor increases recovery aggressiveness and selectively attenuates pilot input. The processor during the state of threat existence is programed to execute in a successive iteration: (a) command the autopilot to fly a second instantiation of the projected recovery trajectory using a second recovery constraint selected by the processor to allow the aircraft to avoid the threat with second degree of flight aggressiveness greater than the first degree and (b) apply a second weighting factor to the pilot input to produce a second degree of blending between pilot input and autopilot control in which pilot input is attenuated.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Introduction

The disclosed aircraft flight envelope protection system uses flight path predictive techniques to provide unified, full-envelope protection, working across the entire spectrum of aircraft flight conditions to address a full spectrum of different types of hazards. Flight path predictions are computed continuously from the aircraft's current situation using a kinematic energy model. Plural predicted trajectories are calculated, each representing a different escape route that will recover from a hazard when the threshold or trigger point for that hazard is reached. The system respects different types of hazards, some dealing with innate aircraft properties, such as speed and altitude limits, and some dealing with external concerns, such as terrain and object avoidance. The disclosed aircraft flight envelope protection system is designed to work across all such threat envelope boundaries.

Although plural trajectories are calculated, the envelope protection system continually assesses, and deprecates trajectories that are not feasible in the aircraft's current situation. A deprecated trajectory is treated by the system as not viable, unless the aircraft's situation changes such that the deprecated trajectory again becomes viable. The disclosed protection system works in the background, and does not override or usurp the pilot's authority until only one viable predicted trajectory remains (all other predicted trajectories have been deprecated), and a threat is triggered. In this event, the protection system automatically deploys an autopilot mechanism to take evasive action to recover from the hazard condition. The protection system may also generate warnings to the pilot, but is preferably not dependent on the pilot to take recovery action once the one remaining viable trajectory reaches the trigger point.

Figure 7:
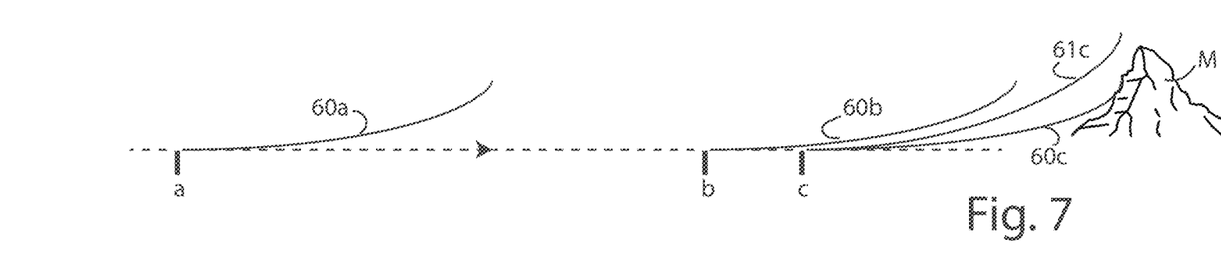
FIG. 7 is an illustration showing how the projected trajectories are iteratively revised for threat avoidance.

Preferably, the predictive envelope protection system is configured to provide a non-binary spectrum of recovery actions, including a passenger-safe, soft-ride recovery at one end of the spectrum and a hard recovery at the other end of the spectrum. When required to avert imminent threat, the system triggers a hard recovery. However in less extreme situations, where there is more time to recover, the system triggers a soft recovery—a passenger safe, smooth recovery. When such soft recovery is triggered the system will optionally blend input from the pilot into the recovery algorithm, allowing the pilot to modify the recovery aggressiveness based on the pilot's skill and experience. Before providing a full explanation of the non-binary collaborative recovery system, it will be helpful to understand how the projected trajectories are developed. The non-binary collaborative recovery system is invoked when a threat is detected and the applicable (e.g., last remaining) projected trajectory is used. Details of the non-binary collaborative recovery system are shown in FIG. 7 discussed in the section entitled, Non-Binary and Collaborative Recovery below.

Figure 1:
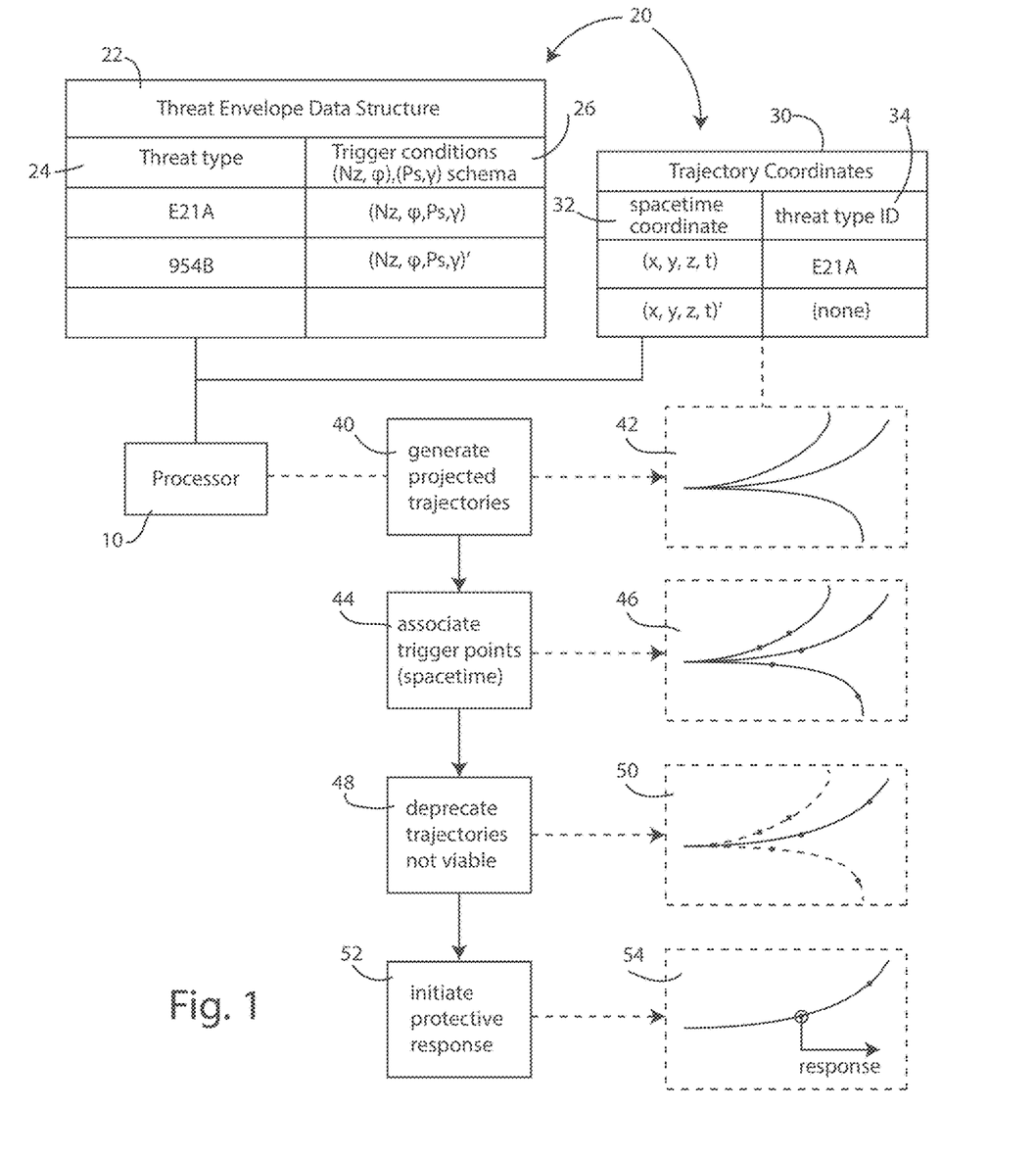
FIG. 1 is a block diagram illustrating the threat envelope and trajectory coordinates data structures, in conjunction with a processor programmed to performs steps to carry out the envelope protection function.

Referring to FIG. 1 an embodiment of the disclosed aircraft threat envelope protection system may be implemented using a processor 10 having an associated memory circuit 20 that is configured according to a predetermined threat envelope data structure 22 that stores a plurality of different types of threats associated with the aircraft 28. Preferably, the processor 10 and associated memory circuit 20 are carried by the aircraft. The data structure may comprise a table, list or matrix of records, each corresponding to a different threat type, shown in columnar form at 24 in FIG. 1. Each threat type 24 has a corresponding trigger condition stored at 26. These trigger conditions are parameterized using a common framework or common schema based on an n-dimensional threat space, and tell the processor 10 under what conditions the particular threat condition has been reached. Importantly, the common schema dimensions of the threat space are chosen so that a full spectrum of different threat conditions can be represented using a common, minimal set of fundamental variables. A presently preferred minimal set of fundamental variables is discussed below in the section entitled Kinematic-Energy Model.

The memory circuit 20 is also configured to support a trajectory coordinates data structure 30 that stores plural trajectories in terms of the spacetime coordinate variables 32 and threat type ID 34. For illustration purposes, the spacetime coordinate variables have been identified using a rectangular coordinate system (x, y, z, t). Other coordinate systems (e.g., spherical) may also be used.

Generating Projected Trajectories

The trajectory coordinates data structure is populated with a sequence of spacetime coordinate variables (separately for each projected trajectory being modeled) that lie on and thus define the recovery trajectory shape in spacetime. To illustrate, the processor 10 is programmed to perform the generate the projected trajectories step, at 40, which results in a plurality of projected recovery trajectories being defined in terms of the spacetime coordinates, as illustrated in the spacetime illustration at 42. Each projected trajectory is computed, taking the current state of the aircraft as the starting point and assuming that each recovery maneuver is initiated at that moment.

In the example illustrated here, three projected trajectories are generated by processor 10. For the remainder of this disclosure three projected trajectories will be illustrated. In a given implementation, different numbers of trajectories may be used to define the working set of plural trajectories. In a commercial or business jet aircraft, three projected trajectories will normally be suitable to support smooth, passenger safe recoveries from threats. For aircraft, such as military aircraft, that may be required to fly inverted or in close proximity to the nape of the earth, a larger number of projected trajectories may desirable.

There are different ways for the processor to determine the spacetime shapes of each of the plural trajectories. In one embodiment the trajectory spacetime shapes follow a standardized set of predefined solution curves, corresponding to a set of known hazard recovery maneuvers that are appropriate for the class of aircraft for which the protection system is designed. Typically these solution curves are based on what a trained pilot would likely fly to recover from the particular hazard. These might include, for example, a standard set of pull-up, dive, turn left and turn right maneuvers, where the specific parameters (e.g., climb and bank angles) are chosen to maximize passenger safety and comfort. In some implementations compound recovery maneuvers may be used, where different classes of maneuvers are concatenated together. For example, a business jet might employ a compound maneuver where a final climb maneuver is preceded by a zoom maneuver to exchange excess airspeed for altitude while capturing the optimum steady state climb. In this embodiment a standardized set of a relatively small number of predefined solution curves (e.g., three projected trajectories) is sufficient for many types of aircraft, including business jets. Working with a relatively small number of solution curves and a small number of fundamental kinematic-energy variables, places a minimal load on the processor. Because the trajectories are continually being recomputed, the system produces good results, even though the solution set has been reduced to only a few projected trajectories, based on a few fundamental variables. Of course, if higher resolution is required for a particular aircraft application, the processor can be programmed to compute a greater number of trajectories, and the calculations can be expanded to support additional variables. Parallel processing techniques and programmable gate array circuit components may be utilized to enhance or replace processor 10 if greater throughput is required.

As an alternative to generating projected trajectories from a small, standardized set of predefined solution curves, the processor can be programmed to select from a stored collection of different families of predefined solution curve sets, each family being designed for optimal recovery from a particular type or class of threat. Thus the solution curve family chosen for recovery from a stall hazard might be different from the solution curve family chosen for recovery from a service ceiling hazard. To assess which family of solutions to employ, the processor can project the current aircraft state onto the n-dimensional threat space to determine which threat family is most proximate to the current aircraft state. In so doing, the processor determines in real time which threat is most pressing and then bases the projected trajectory models on the family of predefined solution curves that is best suited under current circumstances.

Associating Threat Trigger Points to Each Potential Trajectory

Either in parallel as the trajectories are being generated, or serially after the trajectories have been generated, the processor, at step 44, associates applicable trigger points, corresponding to threats identified within the threat envelope data structure, to points in spacetime along each of the projected trajectories. For any given trajectory, initially there may be no detected threats. However, as the aircraft continues to fly and the trajectories are continually recomputed, at some point in time a threat may be detected and this threat (first detected in time) will be associated as a trigger point on each of the trajectories where applicable. As diagrammatically represented in the spacetime illustration at 46, these trigger points represent points along the spacetime trajectory when the aircraft will reach the threat response margin for which evasive or recovery action should be initiated.

It is worth emphasizing again that the generated projected trajectories represent different hypothetical trajectories that the pilot (or an automated system) might elect to follow. Because each of these trajectories is being continually generated, they all represent possible future states of the aircraft. The current state of the aircraft lies at the starting point or singularity from which the projected future trajectories diverge. So long as there are plural projected trajectories available, the pilot remains free to follow whatever course he or she desires. Whatever course the pilot elects to fly, the processor 10 merely re-computes its solutions for the predetermined future trajectories.

Deprecating Projected Trajectories that are not Viable

As the aircraft continues to fly, and as the projected trajectories are continually recomputed, there may be instances where a given trajectory becomes no longer viable. This can happen, for example, when the aircraft lacks sufficient energy to perform the projected trajectory maneuver, or when the projected trajectory maneuver will result violate a speed limit which could potentially damage the aircraft. This can also happen if the projected trajectory places the aircraft on a collision course with a material object with a momentum sufficient to damage the aircraft. The processor 10, at step 48, evaluates each of the projected trajectories on this basis, and decommissions or deprecates any trajectory that is no longer viable. In FIG. 1 at 50, two of the projected trajectories are shown in dotted lines to indicate that they have been deprecated.

Trajectories that have been deprecated are not used in a subsequent protective response. However, because the trajectory solutions are continually being updated by the processor, a deprecated trajectory could return to viability if the condition that caused it to be deprecated is lifted. For example if a trajectory was deprecated because it put the aircraft on collision course with another aircraft, and the other aircraft has since moved out of collision range, the processor will reinstate that trajectory as viable by removing its deprecation state.

Initiating a Protective Response

As illustrated at 52, if the processor reaches a state where only one viable trajectory remains (all others have been deprecated), the processor initiates a protective response, shown at 54. This response can include sending a warning or alert message to the pilot, which the pilot may heed or not. Whether heeded or not, the protective response initiated by the processor is designed to set the aircraft on a computed trajectory that will avoid or escape from the first-encountered threat (if plural threats lie on the computed trajectory). To accomplish this the processor sends one or more commands to an autopilot system, the details of which will be discussed below.

Figure 5:
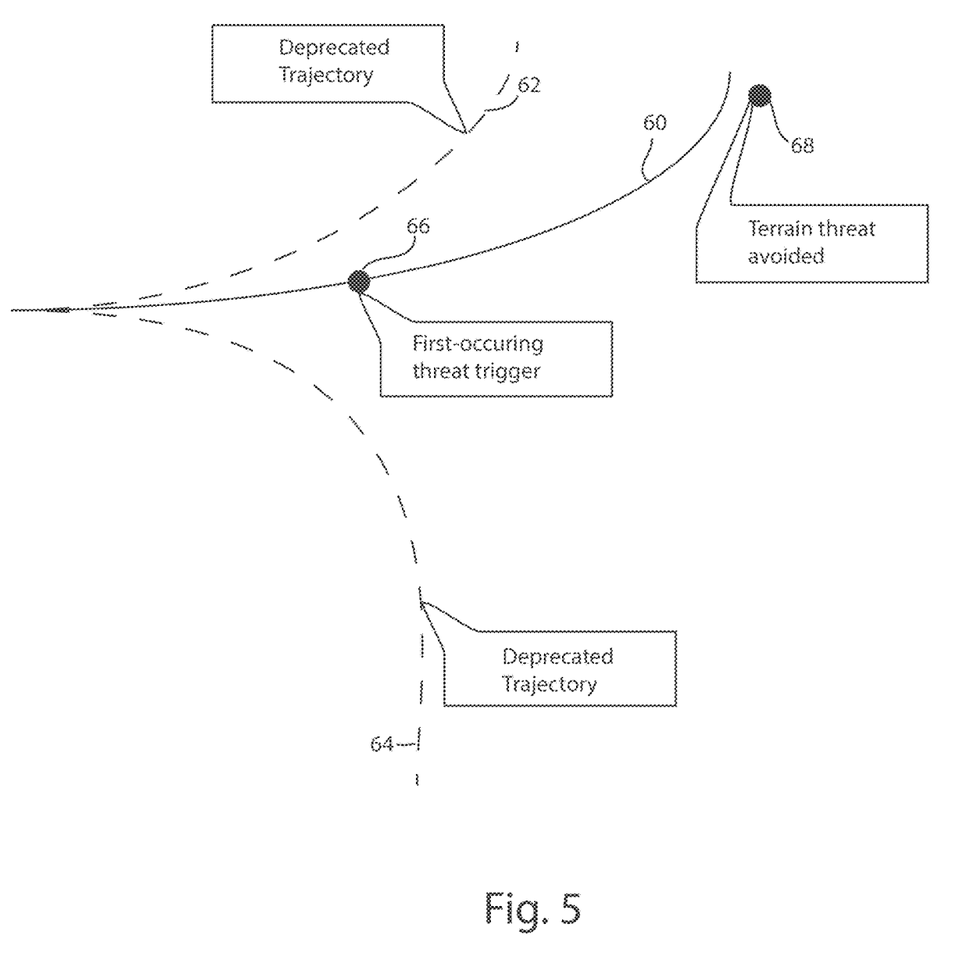
FIG. 5 is a detailed view of one viable and two deprecated trajectories, illustrating how the first-encountered trigger is used to initiate an aircraft protective response.

FIG. 5 illustrates this important hazard recovery response protocol in greater detail. As shown, one trajectory 60 remains viable, while trajectories 62 and 64 have been deprecated. Along the viable trajectory 60, the first-occurring threat 66 triggers the protective response to be initiated. When initiated, the aircraft flies according to the projected trajectory. In effect the projected trajectory becomes the actual trajectory instance that the aircraft will fly, subject to later changes (if any) from a subsequent iterative update of the projected trajectory. As illustrated the projected trajectory is precomputed to clear any terrain threat, such as at 68. Thus when triggered by the first occurring threat at 66 (which could be for example, a speed violation due to a nose-low condition) the recipe used to compute the shape of the projected trajectory is designed to avoid the terrain threat at 68.

Kinematic-Energy Model

The presently preferred, minimal set of fundamental variables used by processor 10 relies upon a kinematic-energy model that defines a predictive trajectory in terms of the aircraft's physical position, its energy state, and the forces acting on the aircraft that affect trajectory. In this regard forces normal to the aircraft's longitudinal axis (normal forces) change the trajectory direction, while forces tangential to the aircraft's longitudinal axis (tangential forces) change the aircraft's velocity along that trajectory.

Figure 2:
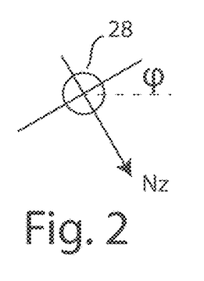
FIG. 2 is a schematic representation of an aircraft, useful in understanding certain force vectors and angles used by the disclosed common schema and kinematic-energy models.

In one embodiment the common schema for the n-dimensional threat space can be represented by a minimal set of fundamental variables, $N_z$, $\phi$, $P_s$ and $\gamma$. As shown in FIG. 2, $N_z$ represents the normal force (force acting normal or perpendicular to the longitudinal axis of the aircraft). In FIG. 2, the longitudinal axis of the aircraft 28 is directed into the page. This normal force $N_z$ also represents the g-force acting on the aircraft. When the aircraft is flying in a level, steady state condition, the g-force acting on the aircraft is the force of gravity. However, when the aircraft is flying with a non-zero bank angle $\phi$ the g-force orientation is changed.

Figure 3:
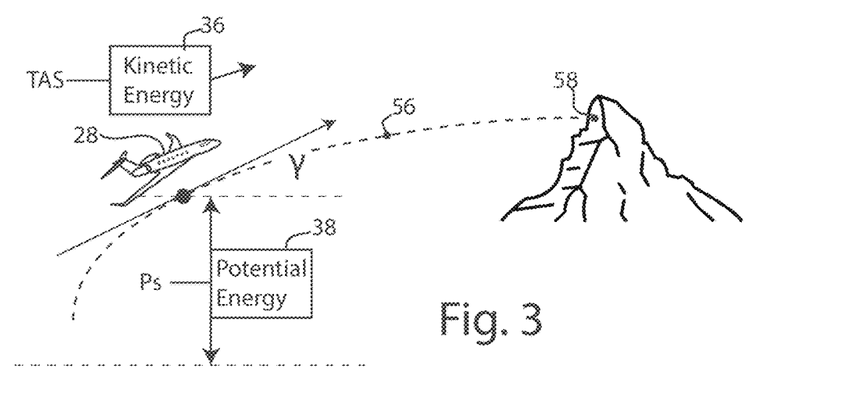
FIG. 3 is a schematic representation of an aircraft, useful in understanding certain energy values used by the common schema and kinematic-energy models, and also showing a projected trajectory with exemplary energy and matter threats.

Illustrated in FIG. 3, the energy state of the aircraft 28 comprise two components: kinetic energy 36, related to the velocity of the aircraft (KE=½ mv² where m is aircraft mass and v is velocity), and potential energy 38, the energy available to produce acceleration. The potential energy includes an aircraft altitude component—potential energy increases with altitude (PE=mgh where m is aircraft mass, h is aircraft altitude and g is the gravitational constant)—and a portable stored energy component representing the amount of additional thrust that can be developed by increasing the power output of the engines. While there are many measurable variables that can be used to calculate the kinetic and potential energy of the aircraft, in one embodiment the kinetic energy 36 is derived from the true air speed (TAS); the potential energy 38 is derived from the aircraft altitude, specific excess power $P_s$ (available thrust power minus drag power) and the flight path angle $\gamma$. The specific excess power $P_s$ is normalized to be independent of the aircraft weight, making $P_s$ a weight-independent energy term. A value $P_s=0$ signifies that there is no excess power available, meaning every bit of power is simply overcoming the drag. In the $P_s=0$ condition, the aircraft can still accelerate by flying nose down, or can still decelerate by flying nose up. This effect is accounted for by the $\gamma$ term, which represents the flight path angle (nose-up, nose-down angle). When a non-zero $\gamma$ angle is invoked, kinetic energy and potential energy are exchanged: a nose-up $\gamma$ angle gives up some kinetic energy to increase potential energy; conversely, a nose-down $\gamma$ angle gives up some potential energy to increase kinetic energy.

Figure 4:
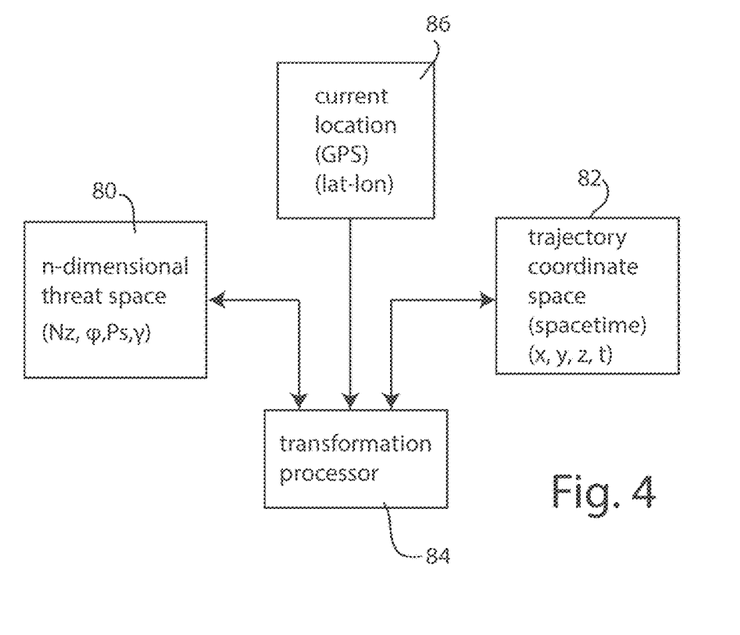
FIG. 4 is a data model block diagram showing the relationship between the n-dimensional threat space and the trajectory coordinate space (spacetime)

These variables may be used both to represent threats within the n-dimensional threat space 80, shown in FIG. 4 and may also be used to calculate the aircraft's position and energy state at future positions in spacetime along a projected trajectory by using kinematic-energy relationships to transform data between the n-dimensional threat space 80 and the trajectory coordinate space 82. The kinematic-energy relationship transformations are performed by the transformational processor 84, which may be implemented by programming processor 10 with the kinematic-energy relationships that relate aircraft $P_s$, $N_z$, $\phi$, and $\gamma$ threat space values to the aircraft trajectory coordinates in spacetime (x, y, z, t).

The disclosed predictive aircraft threat envelope protection system is able to provide full envelope protection because of its unique data model that can represent all threats using a common schema employing a minimal set of fundamental variables. As illustrated in FIG. 4 the disclosed threat envelope protection system, in essence employs a kinematic-energy data model based on a minimal set of variables and processor component that ties key components of the data model together. One key component of the data model defines the n-dimensional threat space 80 by which all threats are representing using a pair of force variables (Nz, $\phi$) and a pair of energy state variables (Ps, $\gamma$). The threats to be protected against that are known a priori are pre-populated into the threat envelope data structure 22 (FIG. 1). Threats known a priori would include, for example threats relating to different energy limits, such as stall limits, over-speed limits and under-speed limits. Some of these limits are known at the aircraft design time, while other limits are calculated during flight.

Another key component of the data model defines the trajectory coordinate space in terms of spacetime variables (x, y, z, t). Some threats, such as terrain objects and other aircraft (both examples of physical matter that occupy space) in the vicinity are more readily represented in coordinate space, based on the object's position. For example the system may utilize map data to store the physical location of terrain structures such as mountains that may be encountered during flight. The system is able to model both energy threats and matter threats. To illustrate, in FIG. 3 two threats lie on the aircraft trajectory, an energy threat 56 (which could be, for example, an aircraft stall limit) and a matter threat 58 (which could be a terrain object, such as a mountain).

To tie these two data model components together, processor 10 (FIG. 1) is programmed with the necessary kinematic equations to function as a transformation processor 84 that uses the current aircraft location 86, obtained from suitable sensor such as GPS, and the force variables and energy state variables within threat space 80, to calculate the projected trajectories in trajectory coordinate space 82. If needed, the transformation processor can also project points in trajectory coordinate space 82 into threat space 80, to assess for example whether the current or projected future location of the aircraft intersects with envelope threat limits.

Full-Envelope Protection

Full envelope protection provided by the disclosed aircraft flight envelope protection system involves two related aspects: (1) the protection afforded by the disclosed system covers all circumstances, not just the most common hazards; and (2) the disclosed system handles plural different threat conditions concurrently. It is not limited to a singular threat. To illustrate the first aspect, the system is designed to provide protection in all circumstances not just in the heart of the flight envelope or for the most common hazards. For example, a conventional overspeed protection system only works while near wings level. At very high bank angles, the overspeed protection is suppressed. The reason for this is logical. The overspeed protection works by pulling the nose up to help slow the aircraft. If the aircraft was at a very high bank angle, inverted for example, pulling the nose up can exasperate the problem instead of alleviating it. The full envelope protection afforded by the disclosed system does not have such limitations and works across the entire spectrum of aircraft flight conditions.

To illustrate the second aspect, the system is designed to provide full protection against all threats not just a single threat. In a conventional enhanced ground proximity warning system (TAWS), for example, protection is provided against ground impact. However low speed protection is not provided—a separate low-speed protection system is conventionally provided for that. In contrast, the disclosed aircraft flight envelope protection system provides protection against all threats in a single system. Handling all threats in a single system avoids conflicts that can arise with a collection of federated systems.

To illustrate, there have been mishaps involving aircraft equipped with TAWS and low speed protection that have hit the ground at slow speed. The problem is that federated systems are not cognizant of other systems assumptions. In the example case, the aircraft was flying at a slow speed, but the low speed protection was not triggered because the speed was not close to stall, although the speed was slow enough to prevent an immediate climb. The ground proximity system was not triggered because the aircraft was on descent to a runway and the system assumed that climb capability existed. Neither system was aware of the other system's proximity to a threat and the assumptions that the other systems made regarding speed and altitude. The disclosed aircraft flight envelope protection system provides a seamless comprehensive system that provides protection against all threats with full awareness of all relevant parameters.

Predictive Envelope Protection

Traditional envelope protection systems use rules of thumb, based on assumptions, to determine when an alert must be generated to alert the crew of an impending envelope excursion. For cases close to the assumed design case, these systems can work reasonably well. However, for cases markedly different from the design point, the system performance degrades or fails completely. Consider again the conventional TAWS, which uses rules of thumb exclusively.

Figure 6A:
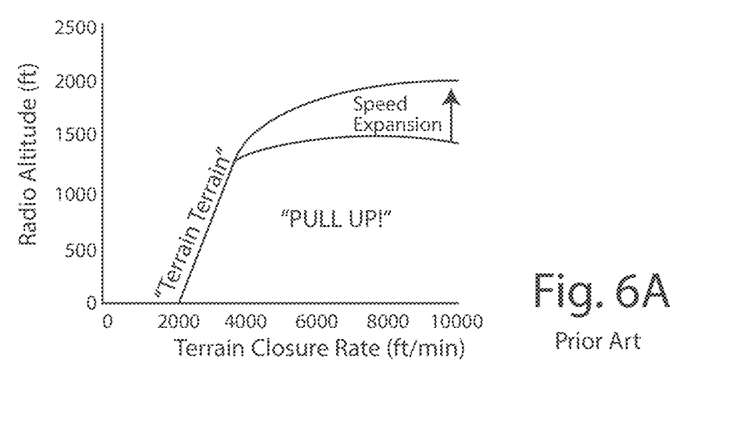
FIG. 6A is a graph of aircraft altitude vs terrain closure rate, illustrating regions where different pilot alert messages are commonly generated in prior art systems.
Figure 6B:
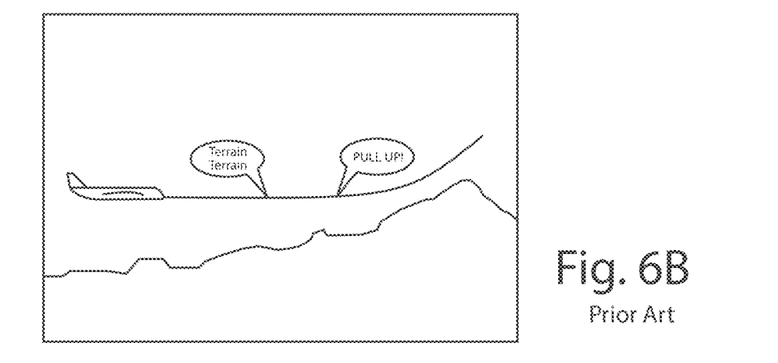
FIG. 6B is a diagram of an aircraft flying above terrain, illustrating where prior art systems will typically issue different pilot alert messages, in the desired case where assumptions about terrain slope are reliable.

An exemplary conventional TAWS system is illustrated in FIG. 6A. This conventional TAWS uses radio altimeter altitude and rate of change to determine timing of the pull-up alert. Under nominal conditions, illustrated in FIG. 6B, the alert will sound at a point that is not so early as to be a nuisance, but early enough for the pilot to react and initiate a climb that will clear the rising terrain. The accuracy of this method is dependent on two factors.

Figure 6C:
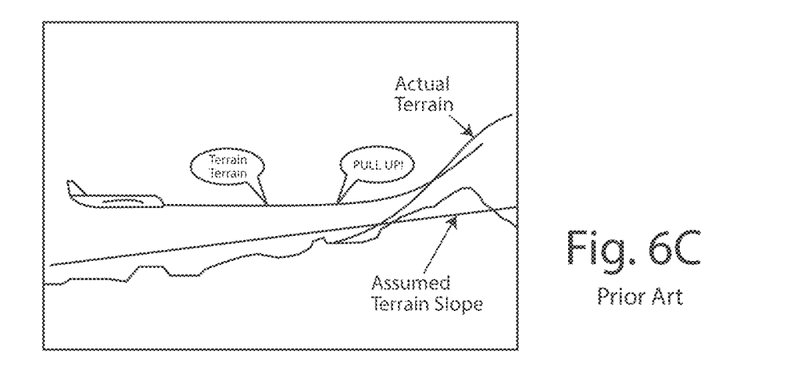
FIG. 6C is a diagram of an aircraft initially flying above terrain, illustrating where prior art systems will typically issue different pilot alert messages, in the undesired case where assumptions about terrain slope do not comport with the actual terrain, such that terrain collision is not avoided by the prior art system.

First, the terrain in front of the aircraft must match reasonably well with the terrain currently being measured. The system looks at current terrain clearance and rate of change of that terrain; but if the terrain slope changes, clearance may not be assured. FIG. 6C illustrates what would happen if the terrain slope varied markedly from current slope. FIG. 6C shows that if the terrain slope increases in front of the aircraft, terrain clearance may not be assured.

Second, the accuracy of this type of conventional system depends on the ability of the aircraft in its current configuration being able to fly the expected profile. Looking again at FIGS. 6A-6C, the illustrated aircraft trajectory is assumed to be able to pull up above the rising terrain. This is an assumption that may or may not be accurate. The conventional TAWS system does not consider high altitude terrain where climb performance is significantly less than at sea level. It does not consider gross weight effects or engine failure conditions. The nominal case may not extend to the entire envelope. In contrast, the disclosed predictive system does not rely on precomputed rules of thumb, but instead looks at the current conditions to predict climb performance. In the disclosed predictive system, the actual terrain in front of the aircraft is used and the actual climb capability is used. In order to accomplish this, the significant factors affecting the climb capability of the aircraft are considered in real time and the actual terrain profile is compared to the current climb capability to determine an accurate warning initiation. While all factors affecting climb capability could be considered, in a practical embodiment it is usually only necessary to consider enough factors to ensure an adequate level of fidelity; insignificant factors having little impact can be excluded.

Kinematic Energy-Methods Modeling

As discussed above, the disclosed predictive aircraft flight envelope protection system uses kinematic modeling that focuses concern only with what happens and not why it happens. The disclosed system computes the relevant predictive trajectory from the physical position of the aircraft and its energy state. The disclosed system is not concerned with the forces or moments that cause that motion but only what the motion is. As a result, parameters such as elevator effectiveness, static longitudinal stability, short period frequency and damping ratio and many other parameters are of no significance. To predict a future trajectory, the disclosed predictive system only needs to concern itself with the forces that affect that trajectory.

In this regard, normal forces change trajectory direction and tangential forces change velocity along that trajectory. With that in mind, the disclosed system models a 3-D trajectory very well by looking only at $P_s$, $N_z$, $\phi$, and $\gamma$. Vertical trajectory is dependent only on the vertical component of $N_z$ which can be modeled easily using the aircraft's current configuration and flight conditions. Simplified modeling using an $N_z$ onset rate and a steady state $N_z$ is more than sufficient to accurately model the trajectory. Horizontal trajectory is dependent only on the horizontal component of $N_z$. Bank angle determines the distribution of $N_z$ into vertical and horizontal components and roll can be modeled adequately using a roll onset rate and a steady state roll rate derived from current aircraft configuration and flight conditions.

The velocity change that occurs along the trajectory is dependent only on the vertical component of the trajectory and the $P_s$ of the aircraft at the time. $P_s$ is specific excess power and it tells the system how much excess power an aircraft has that can be used to climb or to accelerate. If the aircraft is in level flight and $P_s$ is equal to zero, the aircraft will maintain current velocity. If $P_s$ is +100 ft/sec, it will accelerate in level flight. If it is +100 ft/sec but the aircraft is in a climb at 100 ft/sec, the aircraft will climb while holding constant airspeed. By using the current climb and the climb capability expressed in feet per second, the future velocity state of the aircraft can be accurately predicted. FIG. 3 illustrates a single iterative step in the modeling routine that uses kinematic modeling and energy-methods.

Rapid Computation Modeling

The predictive method described above can be computationally intensive to perform real time so some techniques developed for the disclosed embodiment can be helpful. First, accurate predictions of future airspeed are necessary to perform airspeed envelop protection. Computing calibrated airspeed (CAS) and Mach from the modeled true airspeed (TAS) can be computationally intensive. Computing accurate Ps can also be quite intensive. One technique to address these computational issues is to use a table lookup function. Another method is to perform a linear or second order curve fit of Ps as a function of altitude for the nominal case (250KCAS, Mid weight, STD . . . ) and then adjust that for off-nominal conditions using Ps debits. Such debits include, a debit for airspeed (as a function of altitude), a debit for Speed brakes, a debit for Single Engine, a debit for no standard day temp, etc. These can be added/subtracted from the computed debit. Many of the parameters can be computed only once during the modeling. For example, the latitudinal and longitudinal wind drift for each iteration of the model can be precomputed and used for each iteration that follows as the wind drift will be the same.

Multi-Trajectory

The disclosed predictive system is a multi-trajectory system that in one preferred embodiment uses 3 primary trajectories to predict a warning/recovery initiation time. Another embodiment, capable of recovery from aircraft inverted (upside-down) conditions, uses 6 primary trajectories. Before discussing multiple trajectories, first consider a single predictive trajectory system and how that would be implemented into a warning system. For a single predictive trajectory system, the system would look at current state and then assume a recovery would be initiated at that moment. The predictive recovery would then be modeled and tested for proximity to protected threats. For example, if the aircraft were in a dive toward the ground, the system would predict what the nose low recovery would look like and test that trajectory for proximity to both airspeed limits and terrain. If no limits were exceeded and the margins were acceptable, no warning would be issued. If limits were exceeded or margins unacceptably small, a recovery warning would be triggered "PULL-UP" for example. In many cases, a single trajectory is sufficient. In the nose low case against flat terrain, there is really only one good way to recovery and that is to roll wings level, reduce power and pull to recovery Nz until clear of the terrain and airspeed limits.

The reason for supporting plural predictive trajectories (e.g., 6 trajectories in one preferred embodiment) can be illustrated by a second example in which the aircraft is flying level toward a single butte in the desert. In such a case, there are two predictive trajectories that might be used. The pilot could avoid the butte by turning left or right to avoid it, or by staying on course and climbing above it. This raises the question, at what point should the system initiate a "PULL UP" warning? Perhaps not at all if a level turn is best. The solution to this problem is to use multiple trajectories. Since the pilot has multiple escape options, the system models each of those options. In the butte example, the system would model three trajectories, a left turning trajectory, a right turning trajectory, and a climbing trajectory. If a single trajectory violates a limit or has insufficient margins but the others are clear, no warning is issued as the pilot still has margin for another option. A warning is only issued when there is only one viable trajectory and that trajectory reaches a trigger point. So in the butte example, if the left and right turn are ruled out, a "PULL UP" will be issued when the climbing trajectory margins fall below a desired threshold. If due to a different approach or type of terrain, the climbing trajectory is ruled out, a "TURN LEFT" or "TURN RIGHT" warning will be issued when the respective trajectory is the last available and has reached its trigger margin.

Once again, because pilots have multiple escape options, a 100% nuisance free system that provides 100% protection MUST contemplate (and model) all possible escape options. In a practical embodiment a system would not typically model all options—representative examples of each different type of trajectory solution is usually sufficient. For example, in the butte case, it was possible to do a climbing right turn at 10 degrees bank, a climbing right turn at 15 deg bank etc. Each trajectory can be adjusted a tiny amount creating an infinite number of possible trajectories. However, the 30 degree and 29 degree bank trajectories are functionally indistinguishable. Therefore, it is only necessary to model the entire range of recoveries with enough graduation to prevent nuisance warnings. We have determined that for business jets very good results are obtained using a minimum of three trajectories for terrain avoidance and a single trajectory for speed limits. Exemplary trajectories for one embodiment include a level climb, and 30 degree bank left and right climbing turns. Seven (7) trajectory and infinite trajectory systems may also be employed. These greater numbers of trajectories may have utility in military systems, for example, that require nape of the earth nuisance free operation.

While three (3) primary trajectories represent a minimal set, a better implementation is based on six primary trajectories. The reason for this is that we cannot assume that each of the three trajectories mentioned above can be initiated immediately. A level climb, for example, may need to be preceded by a nose high recovery to attain climb speed before initiating the steady climb. Here the three final climbs are referred to as the final climb or the direct climb. For some systems, the aircraft is always in a position to go directly into the final steady state climb. In business jets, the final climb will likely be preceded by a zoom to trade excess airspeed into altitude while capturing the optimum steady state climb. In some cases a nose low recovery must be initiated first where power is left back to keep airspeed under control before reaching an attitude where power can be brought to full for the final climb. Because the aircraft can perform nose high recoveries in two directions and nose low recoveries in two directions (rolling in shortest direction to level or rolling through the vertical to level) there are six total trajectories.

Above, the six trajectories are designated as primary trajectories. If desired, an embodiment may also support additional trajectories to accomplish other purposes. For example, once the preferred trajectory is found, it can be run again using a two-second pilot delay to help determine a more precise warning initiation. Also, if desired, the preferred trajectory may be computed again using a more aggressive recovery model. This more aggressive recovery model is then blended with the originally calculated preferred trajectory, to help blend between soft ride and hard ride recovery options.

Automatic

The predictive aircraft flight envelope protection system is a fully automatic system, which means that it does not rely on pilot intervention. While it can provide and probably should provide a warning to the pilot, the system is automatic and not dependent on the pilot heading that warning to provide protection. This requires a few additional considerations. First, we need a system to give effect to the predictive warning. An auto-pilot of some form needs to be implemented that executes an envelope protecting maneuver. That auto-pilot should have full authority over roll and pitch as well as speedbrake and throttle. Further, since the system must operate in one-engine-inoperative (OEI) cases, the auto-pilot must be able to handle asymmetric thrust conditions. The solution provided by the disclosed system is to add thrust compensation into the basic aircraft control laws. As a result, even when an avoidance is not in progress, the aircraft behaves as if the thrust lines of both engines were along the centerline of the aircraft. In a one embodiment, the N1 difference between engines is used to schedule compensating rudder. There are other recognized methods of thrust compensation that can be used as an alternative to N1.

A second necessary feature of an automatic system is that it must be much more resistant to failures and corrupted sensors than a manual system. With a manual system, the false warning can be easily ignored. With an automatic system, it cannot be ignored and therefore the resistance to false warnings must be significantly higher. The disclosed system thus provides multiple-redundant sensors combined with monitor circuits that determine when a sensor has failed or is suspect, and voter circuits that determine what sensor value is reported to the system when there is some variation between the multiple-redundant sensors.

Finally, the automatic system allows pilot input to be blended with the control provided by the system. In previous systems of this nature (e.g., legacy automatic ground collision avoidance systems used in military applications), the recovery is typically always nearly the maximum capability of the aircraft. The reasons for this derive from performance required for military applications, where nuisance free extreme low level operation (nape of the earth operation) was required without regard to ride quality. In a business jet, the opposite is true. Extreme low level, nape of the earth operations are not required and ride quality for passengers is of paramount importance. As a result, the preferred recovery for a business jet is typically nowhere near the maximum performance capability of the aircraft.

The smooth, passenger safe recovery does create challenges, however. First, during upsets when a jet wake flips an aircraft upside down or a wind shear throws the aircraft toward the ground, a smooth, passenger safe recovery will not suffice. In these extremely rare "Act of God" cases, it is irrelevant how the aircraft got there; it is paramount to recover the aircraft, using all available control power. Second, there are instances where an automatic recovery initiates but during the recovery, the pilot becomes aware of how close to the ground he really is and wishes to increase the terrain margin by increasing performance of the recovery. In this case, the system will permit the pilot to increase recovery aggressiveness by blending pilot input with the calculated smooth, passenger safe recovery. Thus the system flexibly handles the extremes where the smooth, passenger safe recovery may not be appropriate: in one case allowing the system to automatically increase recovery aggressiveness, and in another case allowing the pilot to do so. To address these cases, the system implements a non-binary control system that will be described next.

Non-Binary and Collaborative Recovery

In a binary system, the auto-recovery or warning is either on or off, there are no middle states. As mentioned previously, the disclosed automatic system designed for business jet requires more. The solution is a non-binary system. In the disclosed system, the smooth, passenger safe soft ride is used but pilot blending is allowed and the soft ride will automatically blend into a harder and harder recovery if the margins degrade or fail to improve. One way to accomplish this is by comparing the soft ride preferred trajectory to the hard ride trajectory in the same direction and blending a nudger/fader based on that comparison. Other methods can be used where the margins to the limits can be used to drive the blending. For example, the processor can assess if a smooth ride fails to achieve the margins desired. In such case the trajectory predicting algorithm incrementally increases aggressiveness and directs an increasingly more aggressive recovery in response. The nudger/fader design should be built such that pilots can aid the recovery but are progressively prevented from degrading the recovery when margins are small.

Referring to FIG. 7, a projected trajectory 60*a* is illustrated as beginning when the aircraft is at location a. For this discussion, it is assumed that there is no active threat when the aircraft is at location a, thus the projected trajectory 60*a* simply represents a route calculated by the processor as being appropriate if a threat did happen to present itself. In FIG. 7, only a single trajectory (e.g., 60*a*) is being illustrated. This FIG. 7 applies to both a multi-trajectory system, where other trajectories may already have been deprecated, and also to a single trajectory system where only one projected trajectory is computed.

As illustrated in FIG. 7, the aircraft proceeds forward in level flight along the dotted line until it reaches point b. At point b, the presence of a terrain hazard, such as mountain M is detected. As illustrated, the projected trajectory 60*b*, computed from the aircraft position at b, is adequate to avoid the mountain hazard by flying over it along the prescribed trajectory 60*b*. All conditions being the same at point b as they were at point a, the shape of projected trajectory 60*b* is the same as that of projected trajectory 60*a*, computed moments before. Both trajectory 60*a* and 60*b* are computed by the processor using a smooth, passenger safe trajectory that exerts a nominal g-force on the aircraft passengers (e.g., 1.2 g).

However, conditions may change such that when the aircraft reaches point c during flight, the projected trajectory 60*c*—based on the same smooth, passenger safe trajectory parameters as trajectories 60*a* and 60*b*—is no longer adequate to clear the mountain M. Conditions may change, for example because of changes in air currents or because of actions taken by the pilot. The system still has time to correct for the inadequacy of trajectory 60*c* and thus recomputes at point c a new trajectory 61*c* that uses a more aggressive recovery formula which will permit a stronger g-force to be exerted on the aircraft passengers (e.g., 1.3 g).

Figure 8:
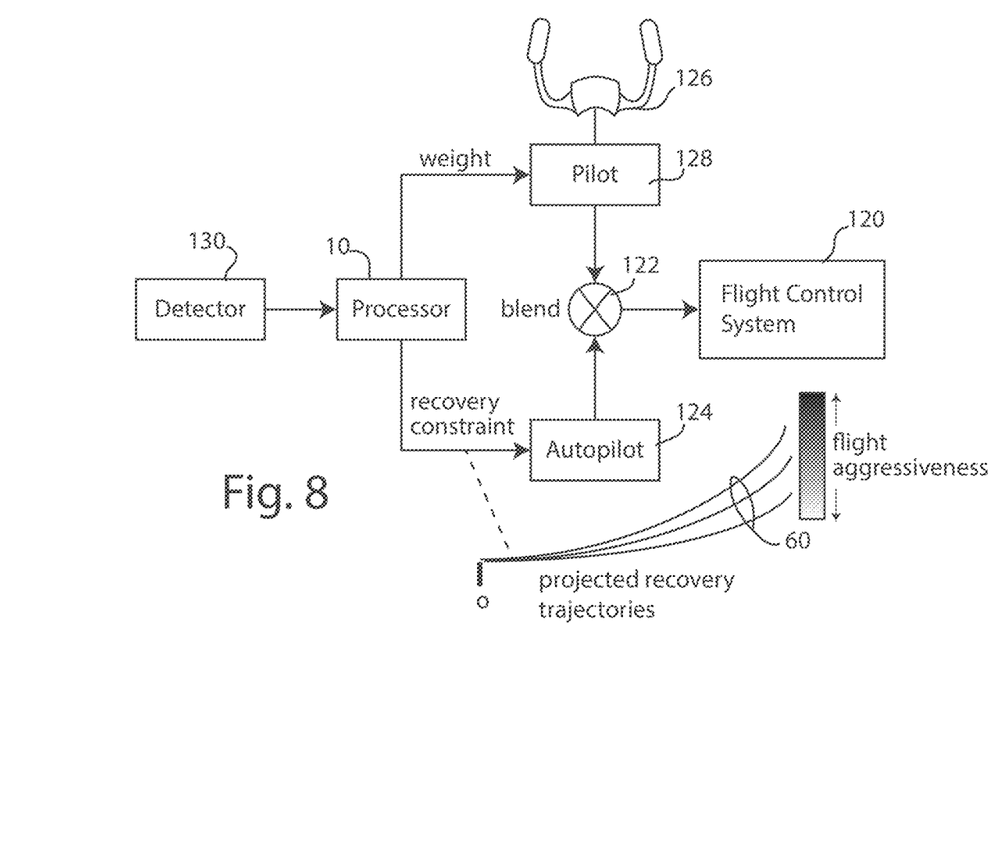
FIG. 8 is a block diagram of the non-binary collaborative recovery system.

FIG. 8 illustrates one embodiment of the non-binary recovery hazard recovery system, implemented using a processor, such as processor 10 and associated components. In this embodiment, the non-binary hazard recovery system is designed to supply flight commands to a flight control system 120, which in turn controls the control surfaces, engines and other aircraft components that affect flight. The flight control system 120 receives an input from a signal blending or mixing circuit 122 (which may be implemented by processor 10 or as an external signal processing or logic gating circuit), to supply the flight control system with a blend of flight commands from the pilot and from the autopilot 124. As will be explained, in some instances this blend of inputs may range from full pilot control to full autopilot control, with a variety of mixtures between where both pilot and autopilot affect what commands are sent to the flight control system 120.

As illustrated, the pilot input will typically be supplied via a inceptor or flight control stick 126, the output of which is processed by the pilot input weighting attenuator 128. The weighting attenuator receives a weight command from processor 10, and this weight command is used to vary or attenuate the degree of pilot input, the attenuation factor ranging from 0% (no attenuation is applied) to 100% (no pilot signal is passed). The weighting attenuator can be designed to supply a linear attenuation range, a piecewise attenuation range, curve-fit range or the like.

In a more sophisticated embodiment, pilot attenuation can be considerably more complex than a mere numerical weighting factor. In this embodiment, a blending schedule is stored in memory accessible by the processor 10 and this schedule is used to define to what degree pilot influence over the trajectory is permitted. This schedule would define a range (not necessarily a linear range) between gentle and hard recovery and may be stored in a lookup table for access by the processor. In other words, the processor can employ a blending schema selected from the group of schema including linear blending models, non-linear blending models and combinations of the two.

The processor 10 also calculates the projected trajectory (such as those discussed in connection with FIG. 7). As described above, the processor generates the projected trajectory iteratively, each iteration starting at the aircraft's current position, shown in FIG. 8 as the origin o. The projected trajectories can be generated to produce a range of trajectories 60 having different degrees of flight aggressiveness. Although the general shape of the trajectory curves 60 are the same, the degree of aggressiveness is controlled by a recovery constraint property calculated by the processor by algorithm or lookup table. The processor determines the recovery constraint, and thus the proper degree of aggressiveness algorithmically by assessing how close the aircraft is to the detected threat, based on information from the threat detector system 130.

The threat detector system 130 illustrated here will in many instances be developed from a collection of different types of sensors, each selected to sense a property relevant to a particular type of threat. Thus an airspeed sensor would provide detection of an over-speed or under-speed threat, an active terrain sensor (e.g, RADAR, LIDAR) or a map-based GPS enabled passive terrain would provide detection of a terrain collision threat.

Non-binary Collaborative Recovery Algorithm

The processor 10 is programmed to repeatedly compute one or more projected trajectories through successive iterations. As discussed above, this is done even when there are no detected threats. Thus the projected trajectories serve as the potential starting point for executing a recovery maneuver in the event a threat is detected from one of the inputs of the detector system 130.

Depending on the type of aircraft involved, the processor will compute these projected trajectories using a recovery constraint property that will achieve a trajectory that is appropriate for the type of aircraft. In a commercial or business jet, the preferred initial trajectory is one that provides a smooth, passenger safe recovery at minimal g-force. The recovery constraint property may be changed later, if the initially computed recovery is not proving to be successful, but at first a smooth, passenger safe recovery is assumed to be appropriate by the system.

In the event a threat is detected (a state of threat exists), the processor is programmed to supply the most recently computed projected trajectory to the autopilot 124. During this first iteration after threat detection, the processor is programmed to allow full blended input from the pilot as well. This is achieved by setting the pilot attenuation factor to 0% (no attenuation). In this state the autopilot 124 will supply flight instructions based on the most recently computed projected trajectory and these instructions will be blended at 122 with input from the pilot. Thus if the pilot elects to increase the aggressiveness of the recovery maneuver to sustain a higher g-force, that would be permitted. Alternatively, if the pilot elects to countermand the autopilot maneuver, effectively cancelling the recovery trajectory being flown by the autopilot, that would also be permitted.

However, the aircraft behavior set in motion by operation during this first post-detection iteration is not the end of the story. If during the next (or any subsequent iteration) the detector system 130 indicates that the currently executing trajectory will not avoid the hazard, a new more aggressive trajectory is calculated (using a different recovery constraint to increase aggressiveness) and a new attenuation factor is supplied to the pilot input weighting attenuator 128 to thereby reduce the degree to which the pilot can adversely alter the new trajectory. The weighting attenuator 128 can, for example, allow the pilot to increase the aggressiveness of the recovery even more than the new trajectory calls for, but restrict (or even fully prevent) the pilot's ability to decrease aggressiveness or take other action that would reduce the effectiveness of the new trajectory. However, once the state of threat existence is removed, the processor is programmed to revert to a blending state permitting the pilot input to have full or normal control over the aircraft.

The non-binary collaborative recovery system thus continues to operate in this iterative fashion until a successful recovery solution is calculated and the aircraft clears the hazard. Through each successive iteration, the degree of aggressiveness will increase, if needed, from the initial soft recovery (e.g., 1.2 g), to a more aggressive recovery (e.g., 1.3 g)—during which time some pilot input is accepted—and finally to a very aggressive recovery (e.g., 1.5 g to 2.0 g) during—during which time the pilot input is locked out.

In this way the system achieves a non-binary recovery that is not simply on or off. The recovery will automatically proceed in stages, at each iteration of the projected trajectory computation. Looking at the autopilot 124 component of the system alone, the autopilot is not merely one or off; but rather it will perform increasingly aggressive recovery trajectories until the threat is cleared. I this regard, a countermanding input from the pilot may have no bearing on whether the initially computed projected trajectory ends up being insufficient to clear the target. Conditions external to the aircraft may be the cause, such as changes in air turbulence, air pressure, wind speed, and the like. The non-binary aspect of the system allows the recovery trajectory to be adapted for optimal passenger comfort, given the current aircraft situation, as quickly as the processor can compute a fresh iteration, which it is normally designed to do continuously.

The value of continuous iteration of the predicted trajectory solution cannot be overstated. Continuous iteration allows the the non-binary recovery system to permit collaborating input from the pilot. Collaboration is handled by the processor in an intelligent way, allowing pilot input with it is safe to do so, while gradually locking out pilot input when the safest course of action is to allow the autopilot to have full control. In one aspect, the blending system adjusts the ratio of pilot input to autopilot control signal input.

The collaborative aspect of the disclosed system achieves a form of human-machine sensor fusion, where the autopilot system 124 is supplied with trajectory commands generated based on onboard aircraft sensors, terrain data and other technology systems. Concurrently, the human sensor (i.e., the pilot) is responding to conditions perceived by the pilot's human sensory organs, processes those based on the pilot's skill and training and inputs these flight commands via the inceptor or flight control stick 126. The processor 10 and the blending or mixing circuit 122 perform sensor fusion of these two disparate sources (human and machine), to provide greater certainty that the aircraft trajectory is correct and will provide a smooth, passenger safe recovery, and in many cases, the optimal trajectory. Regarding fusion of human and technology inputs, both human capabilities and modern electronic signal processing capabilities are very capable; and yet in some important ways they are very different.

The collaborative aspect of the disclosed system fuses these two disparate inputs to provide, in most cases, a better solution than would be possible with only one of the inputs alone. The system is designed as described above, so that during the initial iterations after detection of the hazard, the pilot input is permitted, possibly without any attenuation at all. In contrast, during later iterations the pilot input is attenuated, possibly locked out altogether, if the recovery trajectory is not working. Permitting pilot input during the initial iterations is advantageous, because pilots may sense aspects that the technology sensor systems have missed, and the pilot may have experience with the particular aircraft or the particular conditions that are more sophisticated than the processor could generate from technology sensors. However, during later iterations, if the threat is still present, attenuating pilot input is advantageous, because the pilot may be distracted or impaired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A hazard recovery system for an aircraft having a flight control system capable of receiving flight commands from a pilot input and from an autopilot system comprising:
    a processor programmed to supply flight commands to the flight control system concurrently using inputs from both pilot input and autopilot by selectively blending pilot input with control signals from the autopilot to generate a blended projected recovery trajectory;
    the processor programmed to generate the projected recovery trajectory through successive iterations that each begin at the current aircraft location and utilize a recovery constraint selectable by the processor that influences a degree of flight aggressiveness;
    a detection system that identifies and invokes a state of threat existence if a threat exists along the projected recovery trajectory;
    the processor during the state of threat existence, being programmed to execute in a first iteration: (a) command the autopilot system to fly a first instantiation of the projected recovery trajectory using a first recovery constraint selected to allow the aircraft to avoid the threat with first degree of flight aggressiveness and (b) apply a first weighting factor to the pilot input to programmatically and responsive to the detection system attenuate the degree to which the pilot input can adversely alter the projected recovery trajectory, the first weighting factor being selected as a first value within a range between no attenuation and full attenuation inhibiting pilot input;
    the processor during the state of threat existence being programed to execute in a successive iteration: (a) command the autopilot to fly a second instantiation of the projected recovery trajectory using a second recovery constraint selected by the processor to allow the aircraft to avoid the threat with second degree of flight aggressiveness greater than the first degree and (b) apply a second weighting factor different than the first weighting factor to the pilot input to programmatically and responsive to the detection system attenuate the degree to which the pilot input can adversely alter the projected recovery trajectory, the second weighting factor being selected as a second value in the range between no attenuation and full attenuation inhibiting pilot input different from the first value.

2. The hazard recovery system of claim 1 wherein the attenuation of pilot input that oppose the recovery is disparate from the attenuation of pilot input that aid the recovery.

3. The hazard recovery system of claim 1 wherein the processor is programmed to precompute the projected trajectory through successive iterations whether the detection system identifies existence of a threat or not.

4. The hazard recovery system of claim 1 wherein the processor is programmed for a series of iterations, to compute the projected trajectory and assess existence of a threat for each of the series of iterations.

5. The hazard recovery system of claim 1 wherein the processor is programmed to iteratively adjust the weighting factor during the state of threat existence such that pilot input is attenuated from iteration to iteration.

6. The hazard recovery system of claim 1 wherein the processor is programmed to revert to a blending state permitting the pilot input to produce an earlier degree of blending when the predicted margin to the threat is increased.

7. The hazard recovery system of claim 1 wherein the detection system is configured to recognize a plurality of different types of threats according to a common schema.

8. A hazard recovery system for an aircraft having a flight control system capable of receiving flight commands from a pilot input and from an autopilot system comprising:
    a processor programmed to generate a precedent projected recovery trajectory;
    the processor being further programmed to recognize a state of threat existence when a threat is detected along the precedent projected recovery trajectory;
    the processor being programmed during the state of threat existence to initially command the autopilot to fly the precedent projected trajectory and to then to command the autopilot to fly more aggressive subsequent projected trajectory if the precedent projected trajectory is inadequate to avoid the detected threat; and
    a sensor fusion system that concurrently blends pilot input with control signals from the autopilot to allow pilot input to alter the projected trajectory being flown;
    the sensor fusion system applying a variable weighting factor to the pilot input, to attenuate the degree to which the pilot input can adversely alter the subsequent projected trajectory, the variable weighting factor being selected as a value in the range between no attenuation and full attenuation inhibiting pilot input.

9. The hazard recovery system of claim 8 wherein the processor is programmed to control the sensor fusion system to adjust the ratio of pilot input to autopilot control signal input.

10. The hazard recovery system of claim 8 further comprising:
    a signal fusion system that blends pilot input with control signals from the autopilot; wherein the processor is programmed to control the signal fusion system to produce a first ratio of blending between pilot input and autopilot control while the precedent projected recovery trajectory is being flown and to produce a second ratio of blending between pilot input and autopilot control while the subsequent projected trajectory is being flown.

11. The hazard recovery system of claim 10 wherein the second ratio of blending attenuates pilot input different from the first blending ratio.

12. A method of performing hazard recovery in an aircraft having a flight control system capable of receiving flight commands from a pilot input and from an autopilot system comprising:
using a processor onboard the aircraft to generate a precedent projected recovery trajectory;
the processor programmed to recognize a state of threat existence when a threat is detected along the precedent projected recovery trajectory;
the processor during the state of threat existence initially commanding the autopilot to fly the precedent projected trajectory; and then
commanding the autopilot to fly more aggressive subsequent projected trajectory if the precedent projected trajectory is inadequate to avoid the detected threat,
the processor concurrently blending pilot input with control signals from the autopilot to allow pilot input to alter the projected trajectory being flown by applying a variable weighting factor to the pilot input, to attenuate the degree to which the pilot input can adversely alter the subsequent projected trajectory, the variable weighting factor being selected as a value in the range between no attenuation and full attenuation inhibiting pilot input.

13. The method of claim 12 further comprising:
using the processor to adjust the ratio of pilot input to autopilot control signal input used to alter the projected trajectory being flown.

14. The method of claim 12 further comprising:
using a sensor fusion system that blends pilot input with control signals from the autopilot; and
using the processor to control the sensor fusion system to produce a first blending ratio between pilot input and autopilot control while the precedent projected recovery trajectory is being flown and to produce a second blending ratio between pilot input and autopilot control while the subsequent projected trajectory is being flown.

15. The method of claim 14 wherein the second blending ratio attenuates pilot input as compared with the first blending ratio.

16. A hazard recovery system for an aircraft having a flight control system capable of receiving flight commands from a pilot input and from an autopilot system comprising:

a processor programmed to supply flight commands to the flight control system lot by selectively blending pilot input with control signals from the autopilot to generate a blended projected recovery trajectory;
the processor programmed to generate projected recovery trajectory through successive iterations that each begin at the current aircraft location and utilize a recovery constraint selectable by the processor that influences a degree of flight aggressiveness;
a detection system that identifies and invokes a state of threat existence if a threat exists along the projected recovery trajectory;
the processor during the state of threat existence, being programmed to execute in a first iteration: (a) command the autopilot system to fly a first instantiation of the projected recovery trajectory using a first recovery constraint selected to allow the aircraft to avoid the threat with first degree of flight aggressiveness and (b) apply a first weighting factor to the pilot input to programmatically and responsive to the detection system attenuate the degree to which the pilot input can adversely alter the projected recovery trajectory, the first weighting factor being selected as a first value within a range between no attenuation and full attenuation inhibiting pilot input;
the processor during the state of threat existence being programed to execute in a successive iteration: (a) command the autopilot to fly a second instantiation of the projected recovery trajectory using a second recovery constraint selected by the processor to allow the aircraft to avoid the threat with second degree of flight aggressiveness greater than the first degree and (b) apply a second weighting factor different than the first weighting factor to the pilot input to programmatically and responsive to the detection system attenuate the degree to which the pilot input can adversely alter the projected recovery trajectory, the second weighting factor being selected as a second value in the range between no attenuation and full attenuation inhibiting pilot input different from the first value; and
wherein the processor is programmed to precompute the projected trajectory through successive iterations whether the detection system identifies existence of a threat or not.

* * * * *